United States Patent [19]

Sawanobori

[11] Patent Number: 5,576,527
[45] Date of Patent: Nov. 19, 1996

[54] OPTICAL READER FOR INFORMATION PATTERN REPRESENTING CODED DATA

[75] Inventor: Keiji Sawanobori, Itabashi-ku, Japan

[73] Assignee: Asahi Kogaku Kogyo Kabushiki Kaisha, Tokyo, Japan

[21] Appl. No.: 491,765

[22] Filed: Jun. 19, 1995

[30] Foreign Application Priority Data

Jun. 20, 1994 [JP] Japan .................................. 6-160552

[51] Int. Cl.⁶ .................................................. G06K 7/10
[52] U.S. Cl. ............................................ 235/455; 235/462
[58] Field of Search ..................................... 235/455, 462

[56] References Cited

U.S. PATENT DOCUMENTS 4,639,606  1/1987  Boles et al. ............................ 235/455

5,179,269  1/1993  Horie et al. ..

*Primary Examiner*—Harold Pitts
*Attorney, Agent, or Firm*—Greenblum & Bernstein P.L.C.

[57] ABSTRACT

An optical reader for optically reading an information pattern representing coded data includes a reading head having a hollow casing with a first opening formed in a wall portion thereof to define a reading area, and a light source to illuminate the reading area. The hollow casing has a second opening formed in another wall portion thereof. The second opening is closed by an optical filter which exhibits a large transmissivity to a part of the light emitted from the light source and included in a predetermined wavelength band. Thus, the reading area is visible through the optical filter and a user can visually confirm whether or not the information pattern to be read is encompassed by the reading area.

9 Claims, 5 Drawing Sheets

OPTICAL READER FOR INFORMATION PATTERN REPRESENTING CODED DATA

BACKGROUND OF THE INVENTION

1. Field of the Invention

The present invention relates to an optical reader for optically reading an information pattern representing coded data, and particularly to an optical reader suitable to read a two-dimensional information pattern representing coded data.

2. Description of the Related Art

Recently, as a two-dimensional information pattern representing coded data, otherwise known as a tessellated information pattern, in which black zones and white zones are two-dimensionally arranged to represent the coded data, has been proposed. An optical reader for reading the coded data from the tessellated information pattern and for decoding the coded data has also been developed. The optical reader is frequently a hand held-type reader, having a reading head including a hollow box-like head casing with a bottom opening formed in a bottom wall thereof which defines a reading area. The reading head also includes a two-dimensional CCD (charge coupling device) image sensor associated with an image formation lens, which is located in a hole formed in a top wall of the head casing. The reading head also includes a light source incorporated in the top wall of the head casing, and the reading area is illuminated by the light source.

For example, when a two-dimensional information pattern is placed on an article, the optical reader is positioned relative to the article such that the information pattern is encompassed in the reading area of the reading head thereof. The information pattern is then illuminated by the light source, and an image of the pattern focuses on a light receiving surface of the image sensor by the image formation lens, whereby the focussed image is converted into image signals by the image sensor. The image signals are read out from the image sensor, and processed for conversion into digital data. The digital data is further processed for decoding, and the decoded data is temporarily stored in a memory. When the decode process is complete, the optical reader produces a visual indication or audio indication, whereby a user is advised that the optical reading of the information pattern has been properly carried out. If necessary, the decoded data is read out from the memory, and is fed to, for example, a host computer in communication with the optical reader.

Before the proper optical reading of the two-dimensional information pattern by the image sensor can occur, the reading head of the optical reader must be positioned properly with respect to the article such that the information pattern is encompassed completely by the reading area of the recording head. Nevertheless, a user cannot visually confirm whether or not the information pattern is encompassed within the reading area of the reading head. Namely, the user cannot known whether or not the proper optical reading of the information pattern can be carried out until the optical reader produces the visual indication or audio indication. Accordingly, if the information pattern is not completely encompassed within the reading area of the recording head, i.e., if the optical reader does not produce the visual indication or audio indication, the user must repeat the process after the reading head is re-positioned with respect to the information pattern.

SUMMARY OF THE INVENTION

Therefore, an object of the present invention is to provide an optical reader for optically reading an information pattern representing coded data, wherein a user can visually confirm whether or not an information pattern is encompassed by a reading area of a reading head thereof.

In accordance with the present invention, there is provided an optical reader for optically reading an information pattern representing coded data. A reading head includes a hollow casing which has a first opening formed in a wall portion thereof defining a reading area. A light source for illuminates the reading area. The hollow casing has a second opening formed in another wall portion of the hollow casing, which is closed by an optical filter which exhibits a large transmissivity to a part of the light emitted from the light source and included in a given band of wavelength, whereby the reading area is visible through the optical filter.

Preferably, the light source has a first light source emitting light, which is substantially prevented from passing through the optical filter, and a second light source emitting light which is transmissible through the optical filter. In this case, the optical reader may also include a switch which has two switching functions such that an ON/OFF switching of only the second light source and an ON/OFF switching of both the first and second light sources are selectively carried out. Otherwise, the optical reader may include a switch which has two-switching functions such that an ON/OFF switching of the first light source and an ON/OFF switching of the second light source are independently carried out. In these cases, the optical reader may have a mechanism for adjusting a quantity of light emitted from the second light source.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
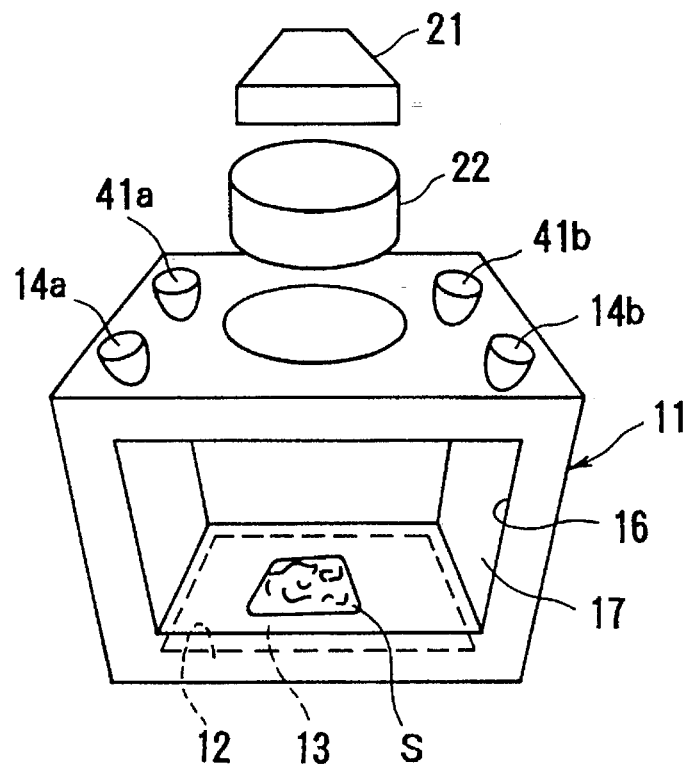
FIG. 1 is a schematic perspective view showing a reading head of an optical reader for an information pattern according to the present invention.

FIG. 1 shows a reading head 11 of an optical reader according to the present invention, which reads a two-dimensional information pattern representing coded data, such as a tessellated information pattern in which black zones and white zones represent coded data. The reading head 11 comprises a hollow box-like casing made of a suitable opaque material and having a bottom opening 12 formed in a bottom wall thereof. The bottom opening 12 defines a reading area 13 in which a two-dimensional information pattern S to be read is positioned.

The reading head 11 also comprises a two-dimensional image sensor 21 associated with an image formation lens 22, which is provided in a hole formed in a top wall of the reading head 11. The two-dimensional image sensor 21 is preferably a solid-state image sensor, such as a CCD (charge coupled device) image sensor. An image of the two-dimensional information pattern S to be read is focussed on a light receiving surface of the image sensor 21 by the image formation lens 22.

The reading head 11 further comprises a first light source 14 (FIG. 2) including two light emitting diode (LED) elements 14a and 14b, and a second light source 41 (FIG. 2) including two light emitting diode (LED) elements 41a and 41b. These LED elements are incorporated in the top wall of the head casing, as shown in FIG. 1. The first and second light sources are associated with prism elements (not shown) such that the reading area 13 is illuminated uniformly with the light emitted from the LED elements 14a, 14b, 41a, and 41b. When the image of the two-dimensional information pattern S is read by the image sensor 21, all of the LED elements 14a, 14b, 41a, and 41b are switched ON. On the other hand, when the reading head 11 is moved to align the two-dimensional information pattern S within the reading area 13 before reading the pattern, only the LED elements 41a and 41b of the second light source 41 are switched ON. To this end, the LED elements 41a and 41b of the second light source 41 are selected such that the light L (FIG. 2 and FIG. 4) emitted therefrom exhibits a distribution of light intensity having a maximum peak at a given band of wavelengths, as discussed below in detail. Likewise, the LED elements 14a and 14b of the first light source 14 to have a different band of wavelength than LED elements 41a and 41b.

Figure 4:
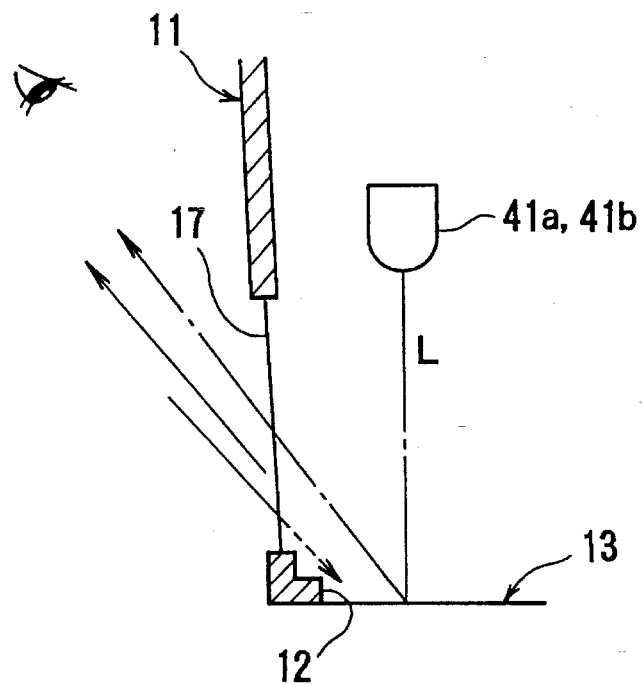
FIG. 4 is a partial sectional view showing a part of the reading head of FIG. 1.

As shown in FIG. 1, the reading head 11 has a front opening 16 formed in a front wall of the head casing thereof, which is closed by an optical filter 17, best shown in FIG. 4. The filter 17 exhibits a large transmissivity to light within a given band of wavelength. Namely, the filter 17 is designed such that the light L emitted from the LED elements 41a and 41b of the second light source 41 efficiently passes therethrough. The front opening 16 is arranged such that a viewer can observe the reading area 13 through the filter 17, during its illumination by the LED elements 41a and 41b of the second light source 41 (FIG. 4). Further, the filter 17 substantially blocks the light emitted from the LED elements 14a and 14b of the first light source 14. This blocking is effective for the wavelength associated with the light emitted from LED elements 14a and 14b.

Figure 2:
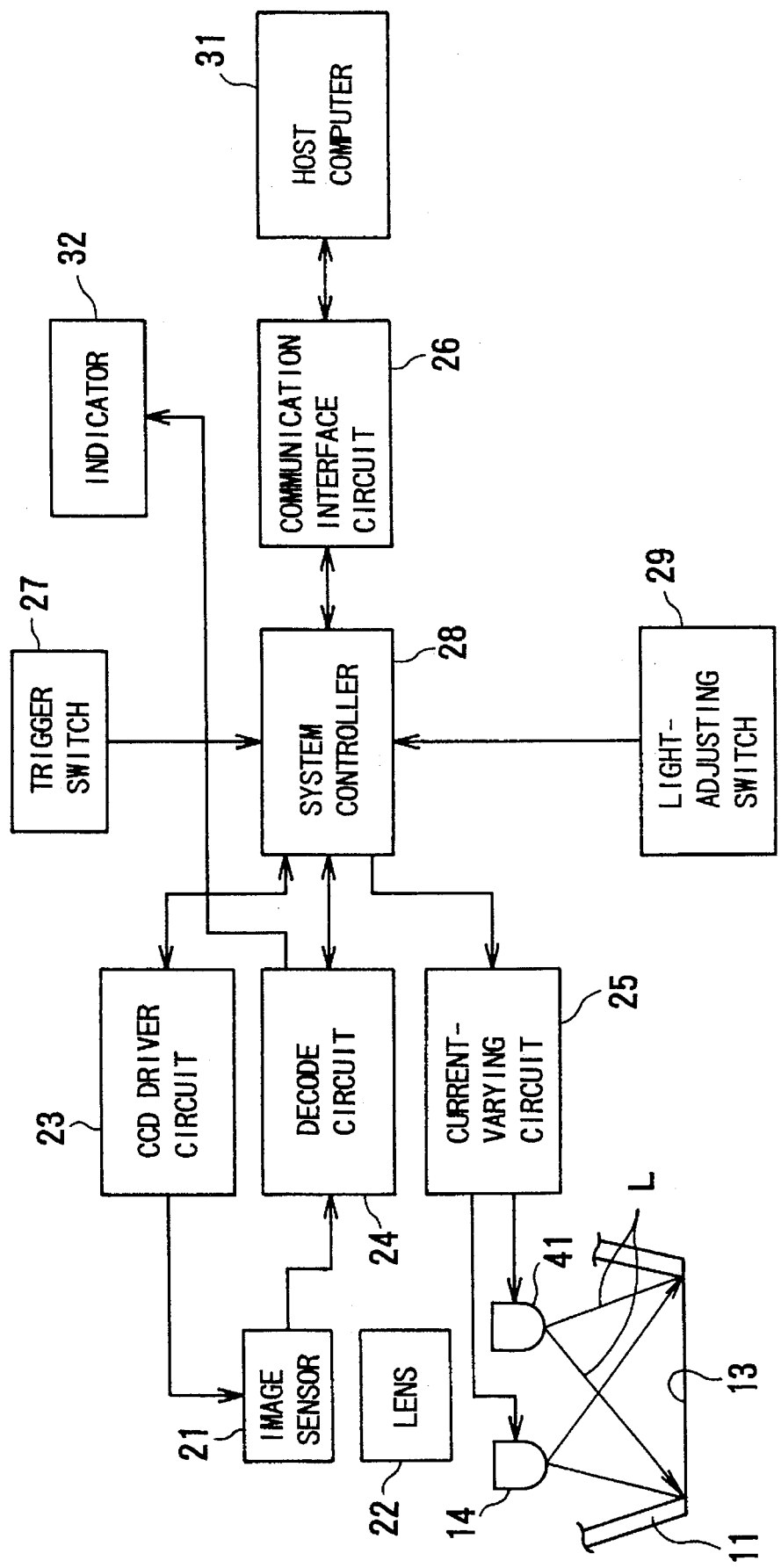
FIG. 2 is a block diagram of a first embodiment of an optical reader according to the present invention.

FIG. 2 shows a block diagram of a first embodiment of the optical reader according to the present invention. The reader comprises a CCD driver circuit 23 for driving the image sensor 21 under control of a system controller 28. A decode circuit 24 is provided between the image sensor and the system controller circuit 28. The two-dimensional image sensor 21 produces image signals on the basis of the optical image of the information pattern S focussed on the light receiving surface thereof, and outputs the image signals to the decode circuit 24 in accordance with driving signals output from the CCD driver circuit 24. In the decode circuit 24, the image signals amplified to a predetermined level, and are then converted into video signals. The video signals are converted into digital data (i.e., coded data) in accordance with the timing signals output from the CCD driver circuit 23, and then processed for decoding. The decoded data is temporarily stored in a memory included in the system controller circuit 28. In addition, the decode circuit 24 is connected to an indicator or display 32 on which a visual indication is displayed on the basis of the video signals when the proper optical reading of the information pattern S has been carried out.

The optical reader further comprises a current-varying circuit 25, a communication interface circuit 26, a trigger type switch 27, and a light-adjusting switch 29. These elements are all connected to the system controller circuit 28. The current-varying circuit 25 controls the supply of current to the LED elements 14a, 14b, 41a, and 41b of the first and second light sources 14 and 41 under control of the system controller circuit 28. The reader communicates to a host computer 31 through the communication interface circuit 26. For example, the decoded data stored in the memory of the system controller circuit 28 is transferred to the host computer 31 at a request therefrom.

The trigger type switch 27 and the light-adjusting switch 29 are provided on a housing of the reader operate manually by a user. In this embodiment, the trigger type switch 27 is a two-step type switch having two switching functions. In particular, when the trigger-type switch 27 is depressed to a first step, the LED elements 41a and 41b of the second light source 41 are switched ON under control of the system controller circuit 28. When the trigger-type switch 27 is further depressed from the first step to a second step, all of the LED elements 14a, 14b, 41a, and 41b of the first and second light sources 14 and 41 are switched ON under control of the system controller circuit 28. Simultaneously, the CCD driver circuit 23 reads out the image signals from the image sensor 21. By operating the light-adjusting switch 29, the quantity of the light L emitted from the LED elements 41a and 41b of the second light source 41 is adjustable under control of the system controller circuit 28.

Figure 3:
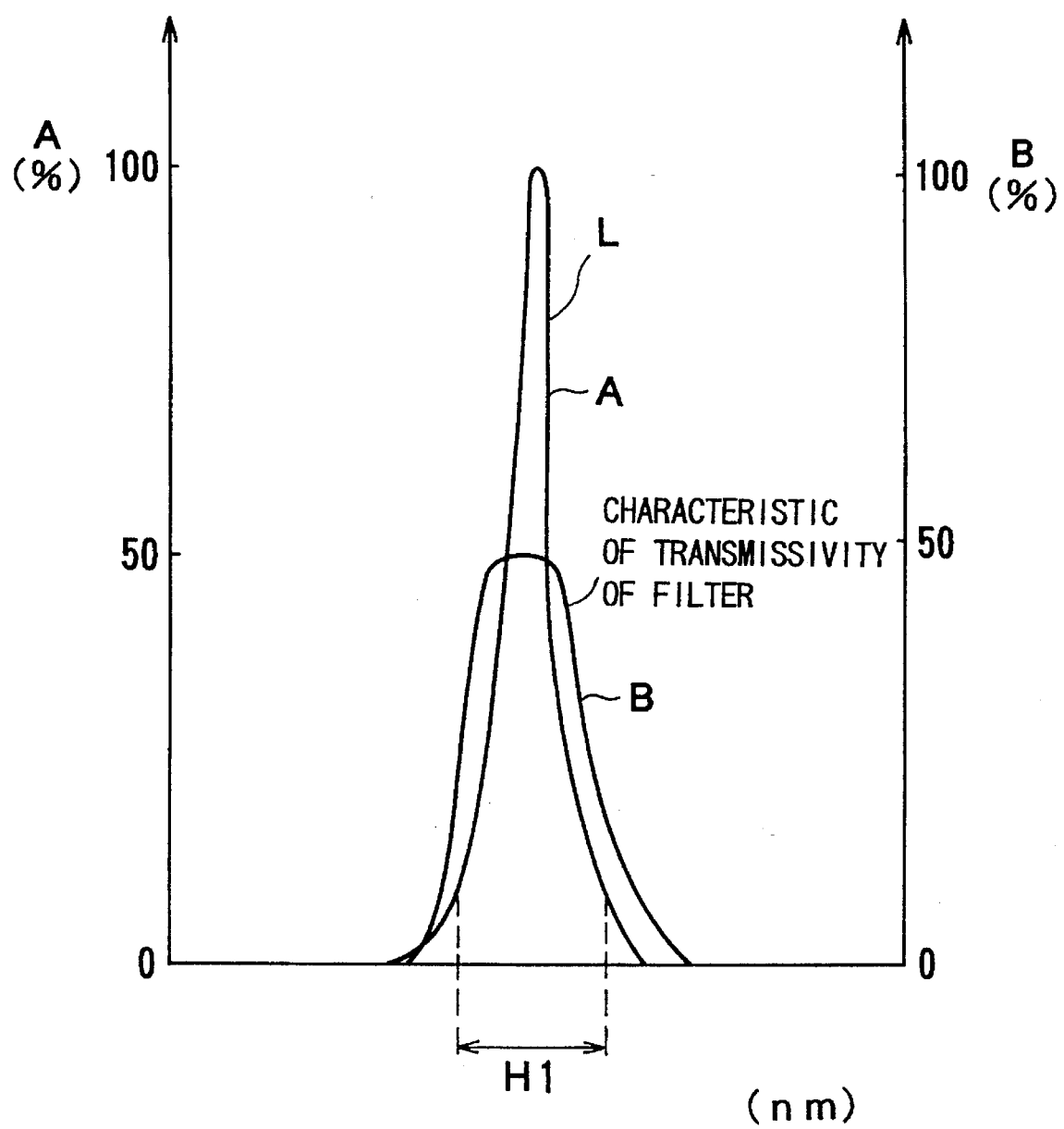
FIG. 3 is a graph showing a relationship between a characteristic of light emitted from a light source provided in the reading head of FIG. 1 and a characteristic of transmissivity of an optical filter provided therein.

FIG. 3 is a graph showing a relationship between characteristics A, the light L emitted from the LED elements 41a and 41b of the second light source 41, and B, the transmissivity of the optical filter 17 vs. the wave length of the light. As is apparent from the graph of FIG. 3, the distribution of intensity of the light L has a maximum peak at a wavelength band H1, which is independent of the variation of the quantity of the light L emitted from the LED elements 41a and 41b. Also, the filter 17 exhibits the largest transmissivity to the light included in the wavelength band H1. Namely, the filter 17 is designed such that the light L emitted from the LED elements 41a and 41b of the second light source 41 efficiently passes through the filter 17. The front opening 16 is arranged such that a viewer can observe the reading area 13, through the filter 17, during its illumination by the LED elements 41a and 41b of the second light source 41, as shown in FIG. 4. Thus, the viewer can visually and immediately confirm whether or not the two-dimensional information pattern S is encompassed in the reading area 13.

In operation, first, the trigger-type switch 27 is depressed to the first step so that the LED elements 41a and 41b of the second light source 41 are switched ON. The optical reader is then positioned such that the two-dimensional information pattern S is encompassed in the reading area 13 of the reading head 11. As is apparent from the foregoing, the positioning of the optical reader with respect to the information pattern S can be visually and immediately adjusted, because the reading area 13 of the reading head 11 is visible through the filter 17 due to the illumination of the second light source 41 (FIG. 4).

If it is difficult for the user to view the reading area 13 through the filter 17 due to outside light, the quantity of the light L emitted from the LED elements 41a and 41b of the second light source 41 can be changed by operating the light-adjusting switch 29, to thereby improve the view of the reading area 13 through the filter 17.

After ensuring that the information pattern is encompassed by the reading area 13, the trigger type switch 27 is further depressed to the second step so that all of the LED elements 14a, 14b, 41a, and 41b are turn ON, and then the reading-out of image signals from the image sensor commences. The image signals are converted into coded data which is then is decoded, as mentioned above. At this time, since almost all of the outside light is reflected by the filter 17, the reading area 13 is substantially cut-off from the outside light.

As is apparent from the foregoing, according to the present invention, the user can visually confirm whether or not the information pattern is encompassed in the reading area of the reading head, and thus the optical reading operation of the information pattern can be facilitated.

Figure 5:
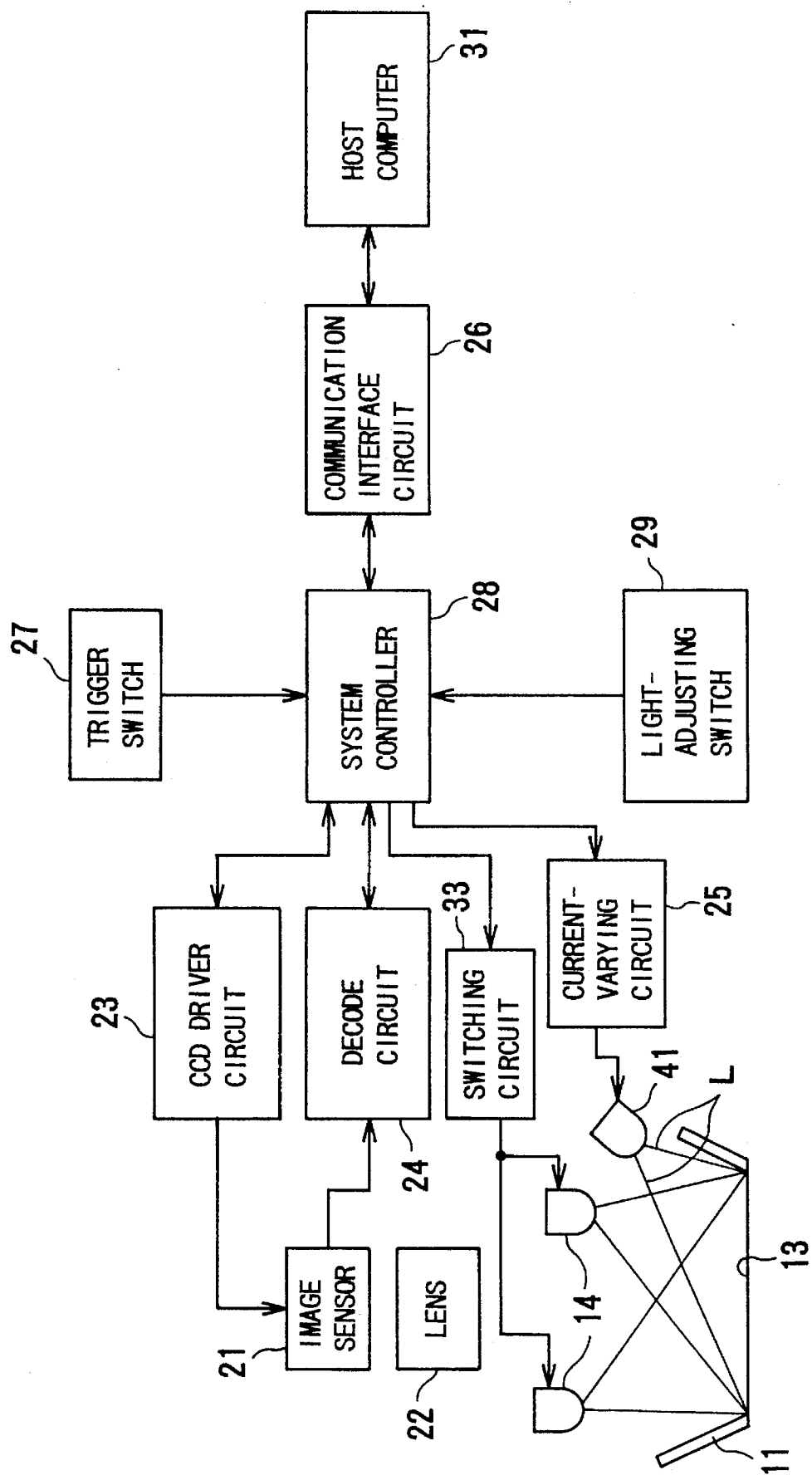
FIG. 5 is a block diagram of a second embodiment of an optical reader according to the present invention.

FIG. 5 shows a second embodiment of an optical reader according to the present invention. In FIG. 5, elements corresponding to those of FIG. 2 are designated by the same references. In the second embodiment, the LED elements of the first light source 14 and the LED elements of the second light source 41 are connected to the system controller circuit 28 through a switching circuit 33 and a current-varying circuit 25, respectively. When the trigger type switch 27 is depressed to the first step, the LED elements of the second light source 41 are switched ON through the current-varying circuit 25, and the quantity of light emitted therefrom can be adjusted by operating the light-adjusting switch 29. Thus, similar to the first embodiment, a visual confirmation of whether or not the information pattern is encompassed by the reading area 13 is possible. When the trigger type switch 27 is further depressed to the second step, the LED elements of the second light source 41 are switched OFF, and the LED elements of the first light source 14 are made ON. Optical reading of the information pattern is thus started.

In the second embodiment, although the number of the LED elements of the first light source 14 are increased because the LED elements of the second light source 41 are switched OFF during the optical reading of the information pattern, consumption of electrical power for the optical reading of the information pattern is lower than in the first embodiment. This is because a relatively large amount of electrical power is necessary energize the LED elements of the second light source 41 due to the fact that a part of the light L emitted from the LED elements of the second light source 41 is lost through the filter 17. Nevertheless, the first embodiment is advantageous in another aspect because the number of LED elements of the first light source 14 is less than the second embodiment.

Figure 6:
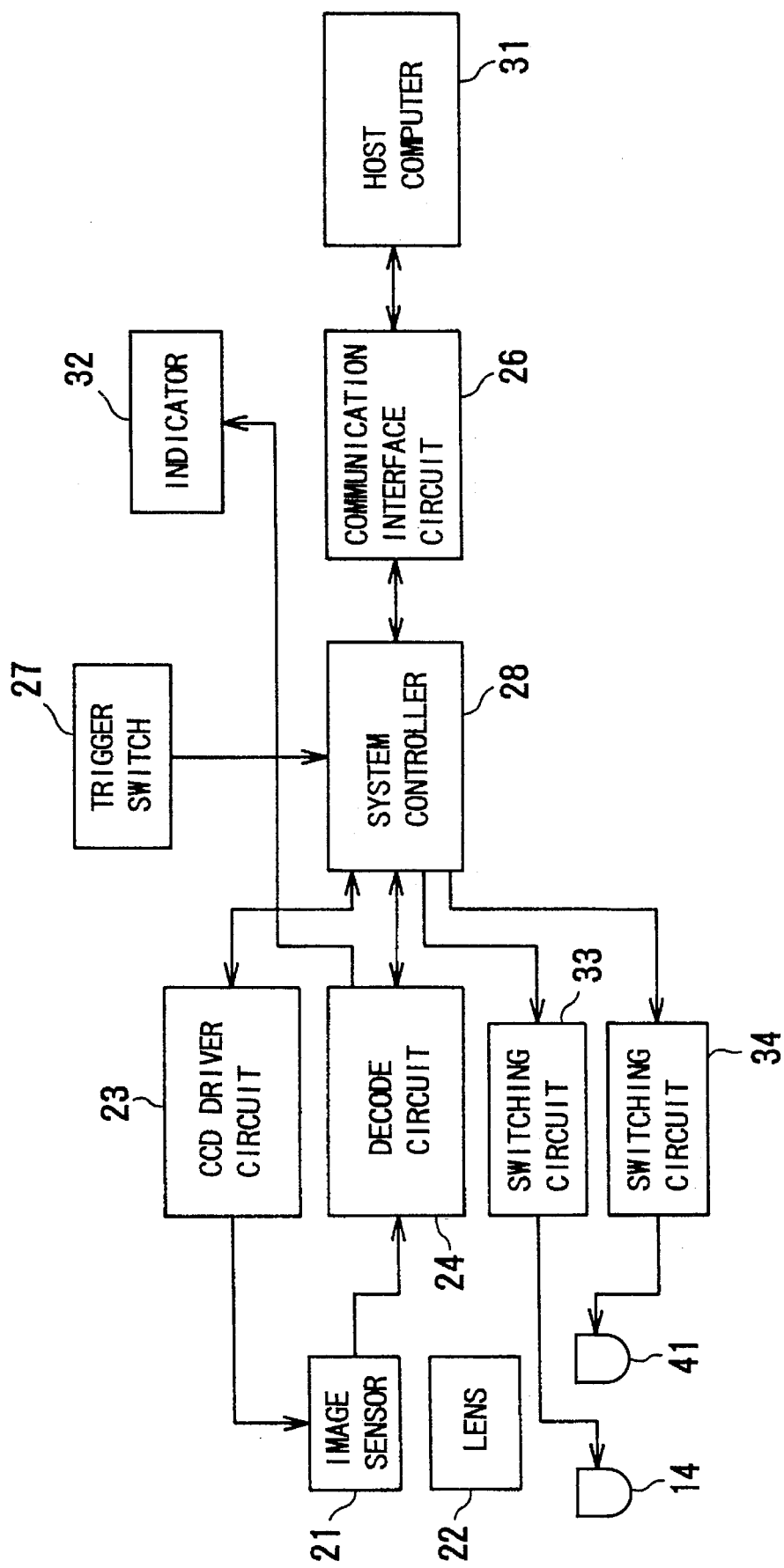
FIG. 6 is a block diagram of a third embodiment of an optical reader according to the present invention.

FIG. 6 shoves a third embodiment of an optical reader according to the present invention. In FIG. 6, elements corresponding to those of FIG. 2 are designated by the same references. In the third embodiment, the LED elements of the first light source 14 and the LED elements of the second light source 41 are connected to the system controller circuit 28 through switching circuits 33 and 34, respectively, and a light-adjusting switch (29) is eliminated therefrom. When the trigger type switch 27 is depressed to the first step, the LED elements of the second light source 41 are switched ON through the switching circuit 34. Thus, similar to the first embodiment, a visual confirmation, whereby it is recognized whether or not the information pattern is encompassed by the reading area 13, is possible. When the trigger type switch 27 is further depressed to the second step, all of the LED elements of the first and second light sources 14 and 41 are made ON, and thus an optical reading of the information pattern is started.

In the third embodiment, although the output of the LED elements of the second light source 41 cannot be adjusted, the optical reader can be produced at a lower cost due to the elimination of the light-adjusting switch (29).

In the embodiments mentioned above, the second light source may comprises standard electrical lamps in the place of the LED elements.

Nevertheless, in this case, the electrical lamps should be covered with an optical filter exhibiting the same characteristic as the filter 17.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-160552 (filed on Jun. 20, 1994) and is expressly incorporated herein, by reference, in its entirety.

I claim:

1. An optical reader for optically reading an information pattern representing coded data, comprising:

a reading head having a hollow casing with a first opening formed in a wall portion for defining a reading area;

light source means for illuminating said reading area, and said hollow casing having a second opening formed in another wall portion of the hollow casing;

an optical filter closing said second opening, which exhibits a transmissivity to a portion of the light emitted from said light source means within a predetermined wavelength band, whereby said reading area is visible through said optical filter.

2. An optical reader as set forth in claim 1, wherein said light source means comprises a first light source emitting light which is substantially prevented from passing through said optical filter, and a second light source emitting light which is substantially transmissible through said optical filter.

3. An optical reader as set forth in claim 2, further comprising switching means having two switching functions, for selectively performing an ON/OFF switching of only said second light source, or an ON/OFF switching of both said first and second light sources.

4. An optical reader as set forth in claim 3, further comprising means for adjusting a quantity of light emitted from said second light source.

5. An optical reader as set forth in claim 2, further comprising switching means having two switching functions, for independently performing an ON/OFF switching of said first light source, and an ON/OFF switching of said second light source.

6. An optical reader as set forth in claim 5, further comprising means for adjusting a quantity of light emitted from said second light source.

7. An optical reader for optically reading an information pattern indicative of coded information, comprising:

a hollow casing having first and second openings formed in first and second sidewalls of said casing;

a plurality of light sources disposed in said hollow casing to illuminate said information pattern, through said first opening, with emitted light having first and second wavelength bands;

a sensor disposed in said hollow casing to sense said emitted light reflected by said information pattern through said first opening; and a filter, disposed in said second opening, substantially blocking said emitted light having said second wavelength band and substantially transmitting said emitted light having said first wavelength band, whereby said information pattern is visible through said filter.

8. An optical reader for optically reading an information pattern indicative of coded information, comprising:

a casing in which a sensor is disposed to sense light reflected from said information pattern, said casing having a guide member and first and second openings, said light reflected from said information pattern passes through said first opening to enter said sensor, and said guide member defining a predetermined distance between said information pattern and said sensor;

a plurality of light sources disposed in said casing to illuminate said information pattern through said first opening with emitted light having first and second wavelength bands; and a filter, disposed in said second opening, blocking said emitted light having said second wavelength band and transmitting said emitted light having said first wavelength band, whereby said information pattern is visible through said filter.

9. An optical reader according to claim 8, wherein said guide member is a side wall in which said first and second openings are formed.

* * * * *